United States Patent
Chszaniecki et al.

(10) Patent No.: US 7,128,546 B2
(45) Date of Patent: Oct. 31, 2006

(54) UNDERWATER GRANULATOR WITH A WATER PIPE MOUNTED IN A SWIVEL JOINT

(75) Inventors: Siegfried Chszaniecki, Hannover (DE); Gregor Chszaniecki, Hannover (DE)

(73) Assignee: Berstorff GmbH, Hannover (DE)

( * ) Notice: Subject to any disclaimer, the term of this patent is extended or adjusted under 35 U.S.C. 154(b) by 205 days.

(21) Appl. No.: 10/827,628

(22) Filed: Apr. 19, 2004

(65) Prior Publication Data

US 2005/0023387 A1 Feb. 3, 2005

Related U.S. Application Data

(63) Continuation of application No. PCT/EP02/10574, filed on Sep. 20, 2002.

(30) Foreign Application Priority Data

Oct. 18, 2001 (DE) ................. 101 51 434

(51) Int. Cl.
B29B 9/06 (2006.01)
(52) U.S. Cl. .................... 425/67; 425/68; 425/70; 425/313
(58) Field of Classification Search .............. 425/67, 425/68, 70, 313, 311, 310, 382 R
See application file for complete search history.

(56) References Cited

U.S. PATENT DOCUMENTS 3,230,582 A * 1/1966 Hoffman et al. .............. 425/67
3,287,764 A 11/1966 Swickard, Jr. et al.
4,321,026 A 3/1982 Lambertus
5,284,433 A * 2/1994 Cates et al. .................. 425/313
6,716,018 B1 * 4/2004 Abrego et al. .............. 425/196

FOREIGN PATENT DOCUMENTS

| CH | 426 215 | 6/1967 |
|---|---|---|
| DE | 1 191 096 | 4/1965 |
| DE | 38 20 980 | 8/1996 |
| EP | 0 124 505 | 11/1984 |
| FR | 848596 | 11/1939 |
| JP | 11129243 | 5/1999 |

* cited by examiner

*Primary Examiner*—Joseph S. Del Sole
(74) *Attorney, Agent, or Firm*—Cohen, Pontani. Lieberman & Pavane

(57) ABSTRACT

An apparatus for granulating extruded material includes an extruder and an underwater granulator connected to the extruder and having a cutting plate for cutting extruded material, the granulator being hinged so that it can swivel about a swivel axis when disconnected from the extruder. A feed pipe is connected to said granulator for providing process water and a discharge pipe is connected to the granulator for transporting and cooling granulate, the feed pipe and the discharge pipe each having a swivel joint with an axis of rotation which is coaxial to the swivel axis.

6 Claims, 2 Drawing Sheets

UNDERWATER GRANULATOR WITH A WATER PIPE MOUNTED IN A SWIVEL JOINT

RELATED APPLICATIONS

This is a continuation of PCT/EP02/10574 filed Sep. 20, 2002, and claims priority therefrom under 35 U.S.C. §120.

BACKGROUND OF THE INVENTION

1. Field of the Invention

The invention relates to an apparatus for granulating extruded material including an extruder, an underwater granulator connected to the extruder and having a cutting plate, a feed pipe connected to the granulator for providing process water, and a discharge pipe connected to the extruder for transporting and cooling granulate.

2. Description of the Related Art

In an underwater granulator, the large number of strands of melt which have been pressed from an extruder and through a breaker plate with nozzle holes arrive at a cutting plate, where a rotating knife cuts the strands of cooled and solidified melt into small pieces, which form a granulate. Adjacent to the cutting plate is a chamber filled with process water, which serves to solidify the melt further and to transport the granulate. The granulate-water mixture is transported through a discharge pipeline to a separation device. In this device, the solidified granulate is separated from the process water, and it is then dried. The underwater granulator is connected to the extruder during operation, usually by means of a flange. So that maintenance work such as the replacement of the cutting plate can be performed, the granulator must be detached from the extruder. So that the assembly and disassembly work can be carried out quickly, it has been found advantageous for the underwater granulator to be attached to the extruder by a movable joint, so that the granulator can be detached from the extruder simply by swinging it away. It can then be reattached to the extruder by swinging it back into position.

In a swinging granulator of this type, however, the problem remains that the process water feed and discharge lines must be detached before the underwater granulator can be swung away, and before operations can commence again after completion of the maintenance work, these lines must be reattached after the granulator has been swung back into position. To avoid this assembly/disassembly work, it would be possible to design the process water feed and discharge lines as flexible hoses. A flexible line could also be equipped with expansion joints. A hose connection, however, represents a safety problem, because the water used in the granulation process can reach temperatures as high as 90° C., and hot water escaping from a leaky or burst hose represents a potential danger. In addition, the large bending radii which hoses require sharply limits the freedom with which the unit can be designed. Systems built with connections of this type for the process water are therefore often bulky and can become too large in comparison with the size of the overall granulation system. When the underwater granulator is swing into and out of position, furthermore, the connecting hoses are subjected to torsional forces, because the connecting points at the underwater granulator rotate when the granulator is swung back and forth. The torsional stresses caused by the rotational movements of the swinging granulator, however, are damaging to the hoses over the long term. Hoses are not designed to endure continuous rotational movements around their own axes. In the case of the swinging granulators according to the state of the art, therefore, the connections between the granulator and the pipeline system are usually detached before the granulator is swung away.

SUMMARY OF THE INVENTION

The invention is based on the task of creating an underwater granulator of the general type in question which can be easily attached to, and detached from, the extruder.

In contrast to the known underwater granulators according to the state of the art, the underwater granulator according to the invention offers the advantages that the feed and discharge pipes for the process water which transports and cools the granulate no longer need to be detached when the swiveling underwater granulator is swung away and that it is nevertheless possible to eliminate hose connections. According to the invention, the feed and discharge pipes each have a swivel joint, the axis of rotation of which is coaxial to the swivel axis of the underwater granulator. When the underwater granulator swivels, the points at which the process water enters and leaves the underwater granulator therefore describe the same circular arc as the ends of the pipes attached to the granulator. Because both the underwater granulator and the feed and discharge pipes are guided by their joints around the same axis, they do not interfere with each other; instead, the feed and discharge pipes and the underwater granulator swing jointly as a single unit.

In an advantageous elaboration of the invention, the feed and discharge pipes are bent into the shape of an "S" between their swivel joints and their connections to the underwater granulator. This curved shape makes it easy to compensate for the offset between the swivel axis of the underwater granulator, that is, the swivel axis of the feed and discharge pipes, and the center axis of the inlets and outlets of the process water at the underwater granulator.

The feed and discharge pipes are preferably provided with a curved shape between their swivel joints and their connections to the underwater granulator. This eliminates large flow resistances in the feed and discharge pipes.

It is advantageous for the feed and discharge pipes to extend vertically from their connections to the underwater granulator and for them also to be coaxial to each other. In this way, the flow conditions in the underwater granulator are simple, and the geometry of the process water connections of existing underwater granulators can be adopted without change.

In an especially preferred embodiment of the invention, the underwater granulator is supported by the feed and discharge pipes. This means that there is no need for a separate joint for the underwater granulator.

So that the feed and discharge pipes can be swung back and forth reliably and without excessive wear, the swivel joints of the feed and discharge pipes are preferably equipped with roller bearings.

The underwater granulator is preferably used for the granulation of thermoplastic compositions as part of compounding processes.

DETAILED DESCRIPTION OF THE PRESENTLY PREFERRED EMBODIMENTS

Figure 1:
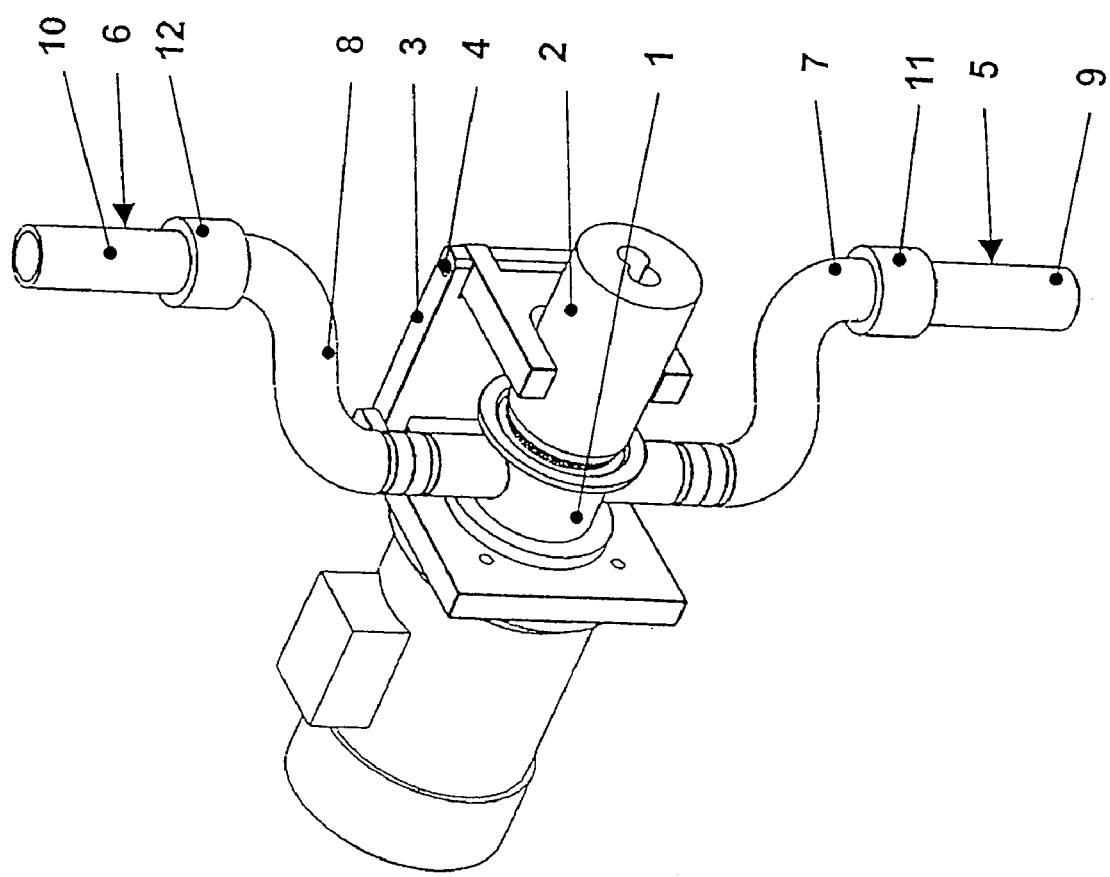
FIG. 1 shows a perspective view of an underwater granulator, connected to an extruder, with bent feed and discharge pipes for the process water, where the feed and discharge pipes each have a swivel joint between the bent section of the pipe and a straight section of the pipe.

FIG. 1 shows a perspective view of an embodiment of the inventive underwater granulator 1. In this figure, the underwater granulator 1 is connected to an extruder 2. To make it easier to connect the underwater granulator 1 to the extruder 2 and to disconnect it again, the granulator is hinged to the extruder by means of a frame 3 so that it can swing around a swivel axis 4. To detach the underwater granulator 1, a fastener is released, and the granulator is swung away from the extruder 2. The underwater granulator 1 is held by the frame 3. To reattach the underwater granulator 1 to the extruder 2, the granulator is swung back into position and refastened. As a result of its swinging, hinged attachment to the extruder 2, no powerful forces are required to mount or to detach the underwater granulator 1. A feed pipe 5 and a discharge pipe 6 for the process water which cools and transports the granulate are connected to the underwater granulator 1. The feed pipe 5, which is below the underwater granulator 1, and the discharge pipe 6, which is above the granulator, each have a section 7, 8, which is bent into the shape of an S, and a section 9, 10 of straight pipe. Between the S-shaped sections 7, 8 and the straight sections 9, 10, there are swivel joints 11, 12, which allow the S-shaped pipe sections 7, 8 to swing back and forth. Because the swivel axis 4 of the underwater granulator 1 and the axes of the swivel joints 11, 12 coincide, the underwater granulator 1 and the S-shaped pipe sections 7, 8 all swivel at the same time as a unit, without interfering with each other. The distance between the swivel axis 4 and the extruder 2 is made large enough to allow sufficient room for assembly/disassembly work.

Figure 2:
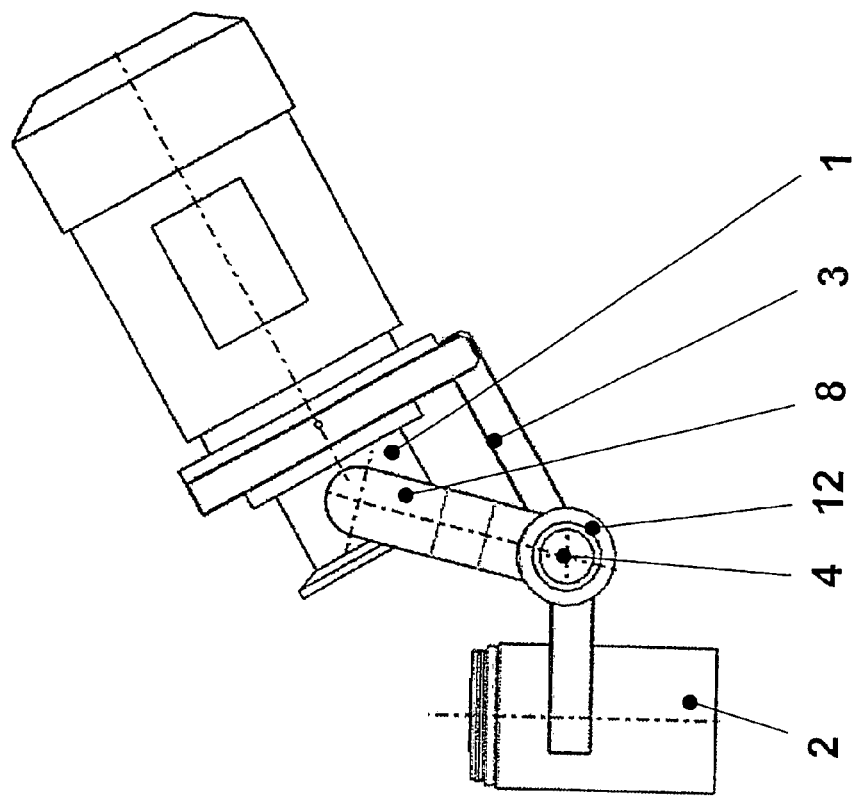
FIG. 2 shows a top view of an underwater granulator according to FIG. 1, connected to an extruder.

FIG. 2 shows a top view of an underwater granulator 1 according to FIG. 1; in this figure the granulator is connected to an extruder 2. It is easy to see that the swivel axis 4 and the axis of rotation of the swivel joint 12 coincide. It is necessary for the swivel axis 4 and the axes of rotation of the swivel joints 11, 12 to be coaxial so that the water connections can be designed without flexible pipeline systems, and so that the connections do not have to be detached when the underwater granulator 1 is to be removed. When it becomes necessary to replace the cutting plate, for example, in the inventive underwater granulator 1, the underwater granulator 1 is removed by detaching its connection to the extruder 2, whereupon the underwater granulator 1 and the process water pipe system consisting of the feed pipe 5 and the discharge pipe 6 are swung away toward the right as a single unit.

Figure 3:
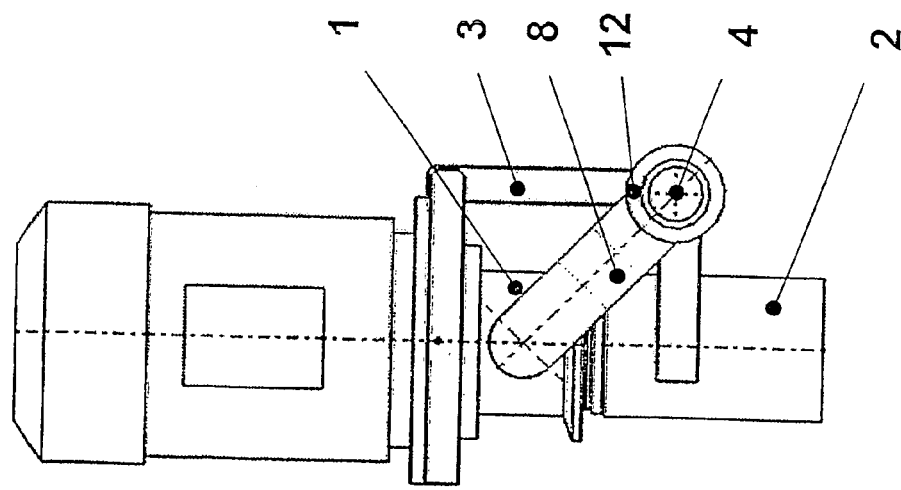
FIG. 3 shows a top view of an underwater granulator according to FIG. 1, after it has been swung away from the extruder.

FIG. 3 shows the inventive underwater granulator 1 in this detached state, after the underwater granulator 1 and the process water pipeline system have been swung away toward the right as a single unit. In this detached state, there is sufficient room to allow maintenance work on the underwater granulator 1 or on the extruder 2.

What is claimed is:

1. An apparatus for granulating extruded material comprising:
   an extruder;
   an underwater granulator connected to said extruder and having a cutting plate for cutting extruded material received from said extruder, said granulator being hinged so that it can swivel about a swivel axis when disconnected from said extruder;
   a feed pipe connected to said granulator for providing process water and having a swivel joint with an axis of rotation which is coaxial to said swivel axis; and
   a discharge pipe connected to said granulator for transporting and cooling granulate and having a swivel joint with an axis of rotation which is coaxial to said swivel axis.

2. An apparatus as in claim 1 wherein said feed pipe and said discharge pipe each have a curved section between the respective swivel joint and the granulator.

3. An apparatus as in claim 2 wherein each said curved section has an "S" shape.

4. An apparatus as in claim 1 wherein said feed pipe and said discharge pipe are coaxial where they are connected to the granulator.

5. An apparatus as in claim 1 wherein said granulator is supported by said feed pipe and said discharge pipe.

6. An apparatus as in claim 1 wherein said swivel joints each have roller bearings.

* * * * *